US011032348B2

(12) United States Patent
Kellicker et al.

(10) Patent No.: US 11,032,348 B2
(45) Date of Patent: Jun. 8, 2021

(54) LIVE STREAM TESTING

(71) Applicant: WOWZA MEDIA SYSTEMS, LLC, Golden, CO (US)

(72) Inventors: Scott Kellicker, Worthington, OH (US); Barry Owen, Littleton, CO (US); James S. Sherry, Broomfield, CO (US); Ian Zenoni, Highlands Ranch, CO (US)

(73) Assignee: WOWZA MEDIA SYSTEMS, LLC, Golden, CO (US)

(*) Notice: Subject to any disclaimer, the term of this patent is extended or adjusted under 35 U.S.C. 154(b) by 0 days.

(21) Appl. No.: 16/840,234

(22) Filed: Apr. 3, 2020

(65) Prior Publication Data

US 2020/0322412 A1    Oct. 8, 2020

Related U.S. Application Data

(60) Provisional application No. 62/829,330, filed on Apr. 4, 2019.

(51) Int. Cl.
*G06F 15/16* (2006.01)
*H04L 29/06* (2006.01)
*H04N 21/2187* (2011.01)
*H04N 21/24* (2011.01)
*H04N 21/2662* (2011.01)
*H04N 21/258* (2011.01)

(52) U.S. Cl.
CPC ......... *H04L 65/80* (2013.01); *H04N 21/2187* (2013.01); *H04N 21/2402* (2013.01); *H04N 21/25841* (2013.01); *H04N 21/2662* (2013.01)

(58) Field of Classification Search
CPC ..... H04L 65/80; H04L 65/607; H04L 65/608; H04L 65/4084; H04L 65/602; H04N 21/2187; H04N 21/2402; H04N 21/2662; H04N 21/25841; H04N 21/2343
See application file for complete search history.

(56) References Cited

U.S. PATENT DOCUMENTS 6,891,565 B1 * 5/2005 Dieterich ............. H04N 19/577
                                                        348/180
7,212,988 B1 * 5/2007 Feldten .................. G06Q 30/02
                                                        705/7.32

(Continued)

FOREIGN PATENT DOCUMENTS

WO    WO-2011159986 A1 * 12/2011 ............. H04L 43/50

*Primary Examiner* — Hieu T Hoang (74) *Attorney, Agent, or Firm* — Porzio Bromberg and Newman P.C.

(57) ABSTRACT

A method includes providing to a media device, prior to streaming of a first live stream, an indication of a test of the first live stream. The indication initiates streaming of a second live stream from the media device to a test audience, and the test audience is based on one or more of an estimated number of viewers of the first live stream, an estimated plurality of locations of the viewers, or an estimated join rate associated with the viewers. The method further includes receiving quality of service (QoS) data associated with the second live stream. The method further includes providing to the media device, based on the QoS data, a message indicating one or more live stream parameters to use during streaming of the first live stream.

20 Claims, 4 Drawing Sheets

(56) References Cited

U.S. PATENT DOCUMENTS

| | | | | |
|---|---|---|---|---|
| 8,352,627 B1* | 1/2013 | Mackie | H04L 67/06 | 709/232 |
| 10,523,727 B2* | 12/2019 | Sehgal | H04N 21/2402 | |
| 2004/0012675 A1* | 1/2004 | Caviedes | H04N 19/14 | 348/180 |
| 2004/0073596 A1* | 4/2004 | Kloninger | H04L 67/16 | 709/200 |
| 2008/0031151 A1* | 2/2008 | Williams | H04L 41/5009 | 370/252 |
| 2008/0310825 A1* | 12/2008 | Fang | H04N 19/40 | 386/200 |
| 2009/0034596 A1* | 2/2009 | Chen | H04L 43/50 | 375/224 |
| 2009/0208140 A1* | 8/2009 | Jayant | H04N 19/60 | 382/309 |
| 2011/0249574 A1* | 10/2011 | Karacali-Akyamac | H04L 41/145 | 370/252 |
| 2013/0096904 A1* | 4/2013 | Hui | H04N 21/6131 | 703/21 |
| 2013/0208080 A1* | 8/2013 | Lukasik | H04N 7/152 | 348/14.09 |
| 2015/0227294 A1* | 8/2015 | Talvensaari | H04L 65/4084 | 715/717 |
| 2016/0205397 A1* | 7/2016 | Martin | H04N 17/004 | 348/192 |
| 2016/0226938 A1* | 8/2016 | Talvensaari | H04N 21/85406 | |
| 2017/0264528 A1* | 9/2017 | Grinkemeyer | H04L 12/2801 | |
| 2018/0070049 A1* | 3/2018 | Pinheiro e Mota | H04L 65/4015 | |
| 2019/0007731 A1* | 1/2019 | Sanders | H04N 5/46 | |
| 2019/0028741 A1* | 1/2019 | Davies | H04N 19/00 | |
| 2020/0096649 A1* | 3/2020 | Brandl | G01S 19/40 | |

* cited by examiner

LIVE STREAM TESTING

CROSS REFERENCE TO RELATED APPLICATIONS

The present application claims priority to U.S. Provisional Patent Application No. 62/829,330, filed Apr. 4, 2019, which is herewith incorporated by reference into the present application.

BACKGROUND

The popularity of the Internet, coupled with the ever-increasing capabilities of personal/mobile electronic devices, has provided users with the ability to enjoy, as well as to generate for others to enjoy, multimedia content almost anytime and anywhere. For example, users may receive streams corresponding to live and video on demand (VOD) content (e.g., television shows and movies) at personal electronic devices, such as computers, mobile phones, and tablet computers. Further, users may use a personal electronic device to capture and stream live events (e.g., sports events) to other users.

In some cases, quality of live streams may vary. For example, a sudden decrease in network conditions may result in an unpleasant viewing condition (e.g., loss of color, loss of definition, stuttering, choppiness, pauses, distortions, etc.). In some cases, a live stream may need to be stopped and restarted, with different stream parameters in place, to compensate for network conditions. However, the stopping and restarting of the stream can be inconvenient for viewers of a live stream event. Further, if the user publishing the live stream is a layperson, they may not know which parameters to adjust, and how to adjust such parameters, to improve viewing conditions for the viewers.

SUMMARY

When a stream publisher is unable or elects not to test an end-to-end stream configuration before going live, unforeseen but preventable issues may crop up. In accordance with aspects of the disclosure, prior to streaming a first live stream, the streaming of the first live stream is accurately "tested" using a second live stream sent to a test audience. In some cases, the test audience is based on historical information associated with a source of the first live stream (e.g., a particular media device or a user associated with the first live stream). In some implementations, the test audience is based on one or more of an estimated number of viewers of the first live stream, an estimated plurality of locations of the viewers, or an estimated join rate associated with the viewers. The test audience can include actual viewer devices, virtual/simulated connections to streaming server(s), or both.

Analytics data (e.g., quality of service (QoS) data) can be collected based on the second live stream and used to initialize the first live stream. For example, by determining quality of the second live stream (as measured at computing devices of the test audience), one or more live stream parameters of the first live stream can be determined, such as by determining a frame rate associated with (e.g., to use during streaming of) the first live stream, a bit rate associated with the first live stream, a frame size associated with the first live stream, a transcoder type for the first live stream, one or more other parameters, or a combination thereof.

By sending the second live stream sent to the test audience prior to streaming the first live stream, the first live stream can be initialized using one or more parameters determined based on the second live stream. As a result, instances of stopping and restarting the first live stream for parameter adjustment can be reduced or avoided.

DETAILED DESCRIPTION

Figure 1A:
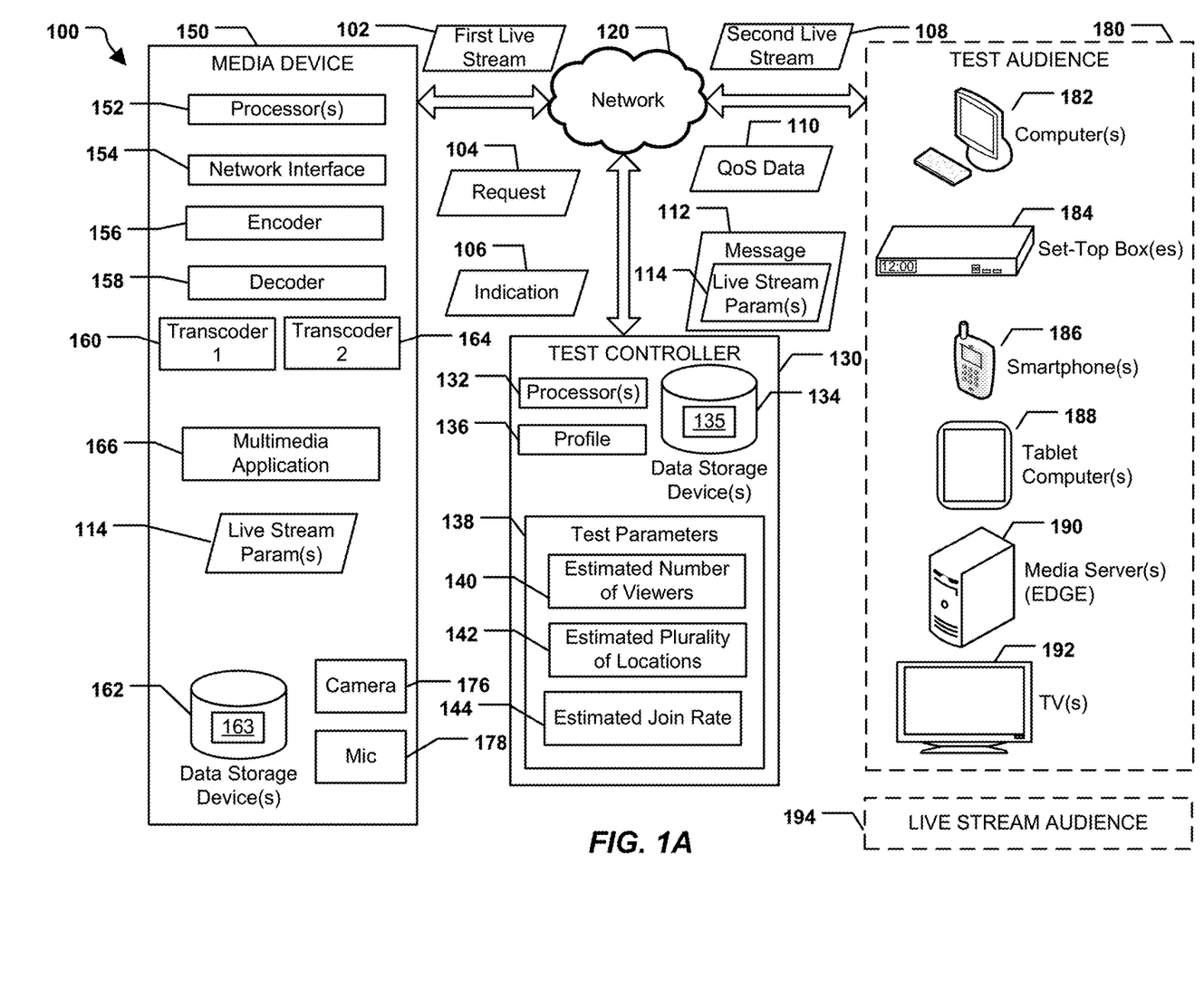
FIGS. 1A and 1B illustrate a particular implementation of a system to support live stream testing.

FIG. 1A illustrates a particular implementation of a system 100 to perform live stream testing. The system 100 includes a test controller 130, a media device 150, one or more computing devices of a test audience 180, and one or more computing devices of a live stream audience 194. In the specific example illustrated in FIG. 1A, the test controller 130 is shown as being distinct from the media device 150. However, it is to be understood that this is not to be considered limiting. In some examples, the test controller 130 may correspond to hardware and/or software components at the media device 150. Thus, it is to be understood that functionality described herein with reference to the test controller 130 may alternatively be performed by corresponding aspects of the media device 150.

The media device 150 may be a computing device, such as a laptop computer, a mobile phone, a smartphone, a tablet computer, a media server, one or more other computing devices, or any combination thereof. In some examples, the media device 150 corresponds to a combination of at least a hardware encoder and video capture device (e.g., camera). In such examples, the hardware encoder receives a media signal from via input interface(s), such as via a high definition multimedia interface (HDMI) or a serial digital interface (SDI), where the media signal corresponds to live media or previously recorded media (e.g., video on demand (VOD) and/or digital video recorder (DVR)) content. In some examples, the media signal includes standard definition (SD), high definition (HD), ultra high definition (UHD), 4K, high dynamic range (HDR), 23.98/24/29.97/30/50/59.94/60 Hz frequency/frame rate, 8-bit color, and/or 10-bit color signals. In another example, the media device 150 receives a media signal (which may include video, audio, or both) from an external device, such as an external camera connected via wire or wirelessly with the media device 150. In yet another example, an external camera is connected to a computing device at a capture site, and the media device 150 receives signals from the computing device at the capture site via a network connection. Thus, it is to be understood that the aspects of the present disclosure can involve more, less, and/or different inter-device and intra-device communication than specifically shown in FIG. 1A.

The media device 150 includes one or more processors 152 and instructions that are executable by the one or more processors 152. The processor(s) 152 may include one or more of a central processing unit (CPU), a graphical processing unit (GPU), a fixed function encoder, or a digital signal processor (DSP). The media device 150 may include software application(s) that perform media serving or processing, hardware systems (e.g., servers) that support or perform media serving and processing, or any combination thereof. Thus, various operations described with reference to the media device 150, or components thereof, may be implemented using hardware, software (e.g., instructions executable by the one or more processors 152), or any combination thereof. In a particular implementation, one or more operations and/or components described with reference to the media device 150 may correspond to operations and/or components of a cloud-based media server (e.g., a media server available as software as a service (SaaS)).

The media device 150 may include one or more network interfaces, such as a representative network interface 154. For example, the one or more network interfaces may include input interface(s) and output interface(s) that are configured to receive data and to send data, respectively. In a particular implementation, the network interface 154 may include a wired interface, a wireless interface, or a combination thereof, that enables the media device 150 to transfer and receive data via a network 120, such as the Internet, a wireless network such as a 3G network, a 4G network, an IEEE 802.11-type network, one or more other networks, or any combination thereof. For example, the network interface 154 may include an Ethernet interface, a wireless interface compatible with an IEEE 802.11 protocol, or other wired or wireless interfaces. Although a single network 120 is shown, it is to be understood that in some cases multiple networks may be used to accomplish inter-device communication (e.g., a combination of local area networks (LANs) and the Internet, a combination of IEEE 802.11 networks and cellular networks, etc.).

The media device 150 may also include one or more encoders, such as a representative encoder 156, and one or more decoders, such as a representative decoder 158, each of which may be implemented using hardware, software (e.g., instructions executable by the one or more processors 152), or a combination thereof. The encoder 156 is configured to encode multimedia content, such as video data, to generate an encoded stream. In some implementations, the multimedia content is generated at the media device 150, such as by a camera 176, a microphone 178, one or more other media capture devices, or any combination thereof. In some implementations, the multimedia content is generated by decoding a received encoded stream at the decoder 158. In some implementations, an encoder is present at a capture site, where a camera captures a live stream. The encoder may be included on-board the camera or may be at a capture site computing device. In such implementations, an encoded stream/signal may be received by the media device 150, and the media device 150 may use the decoder 158 to decode the received stream/signal. Alternatively, the received stream/signal may be provided to a transcoder without executing a separate decoding process.

In one example, the media device 150 includes one or more transcoders configured to generate streams in real-time (e.g., on-the-fly) or near-real-time. To illustrate, in FIG. 1A, the media device 150 includes a first transcoder 160 and a second transcoder 164. In other examples, the media device 150 can include a different number of transcoders. Although distinct transcoders are shown in FIG. 1, it is to be understood that "different" transcoders may correspond to the same transcoding algorithm but with different operating parameters.

The encoders, decoders, and/or transcoders of the media device 150 may be configured to perform various stream processing operations, including but not limited to one or more of bit rate conversion, CODEC conversion, frame size conversion, etc. Depending on a format of a received stream, a playback format supported by a requesting player, and/or transcoding parameters in use, a transcoding operation performed by a transcoder may trigger a decoding operation by a decoder and/or a re-encoding operation by an encoder. In a particular aspect, parameters used by a transcoder are stored in one or more transcoding templates or profiles at the media device 150. The media device 150 may thus be configured to process data in accordance with multiple coding technologies and protocols.

For example, the media device 150 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The media device 150 may support audio encoding types including, but not limited to, advanced audio coding (AAC), AAC low complexity (AAC LC), AAC high efficiency (HEAAC), G.711, MPEG Audio Layer 3 (MP3), Speex, Nellymoser Asao, and AC-3. The media device 150 may support communication (e.g., adaptive streaming and nonadaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 550 may also support real time messaging protocol (RTMP) (and variants thereof), real-time streaming protocol (RTSP), real-time transport protocol (RTP), MPEG-2 transport stream (MPEG-TS), and WOWZ. Additional audio formats, video formats, coder/decoders (CODECs), and/or protocols may also be supported, and it is to be understood that the techniques of the present disclosure do not require any specific protocol or set of protocols for operation.

In a particular implementation, the media device 150 (e.g., by operation of an encoder, a decoder, and/or a transcoder) generates an encoded stream that is an adaptive bit rate (ABR) rendition that may have larger or smaller bit rates, frame sizes (also called video "resolutions"), etc. as compared to an original stream. The media device 150 may stream the ABR renditions to destination devices, as further described herein. Although not shown in FIG. 1A, output from the media device 150 may alternatively, or in addition, be provided to a publishing destination, such as a content delivery network (CDN) or a social network. In the case of publishing to a social network, output may be communicated via a social application programming interface (API). For example, use of the social API may enable output from the media device 150 to be inserted into a message, post, or newsfeed of a particular social networking account (which may correspond to a business entity or an individual). The media device 150 may also transmit output to the test controller 130.

Thus, the media device 150 may be configured to encode and/or transcode multimedia content using various techniques, such as adaptive techniques. In the particular example illustrated in FIG. 1A, live stream parameters 114 are used to capture, process, and/or deliver a live stream. Different sets of live stream parameters 114 may be used for different live streams.

Figure 1B:
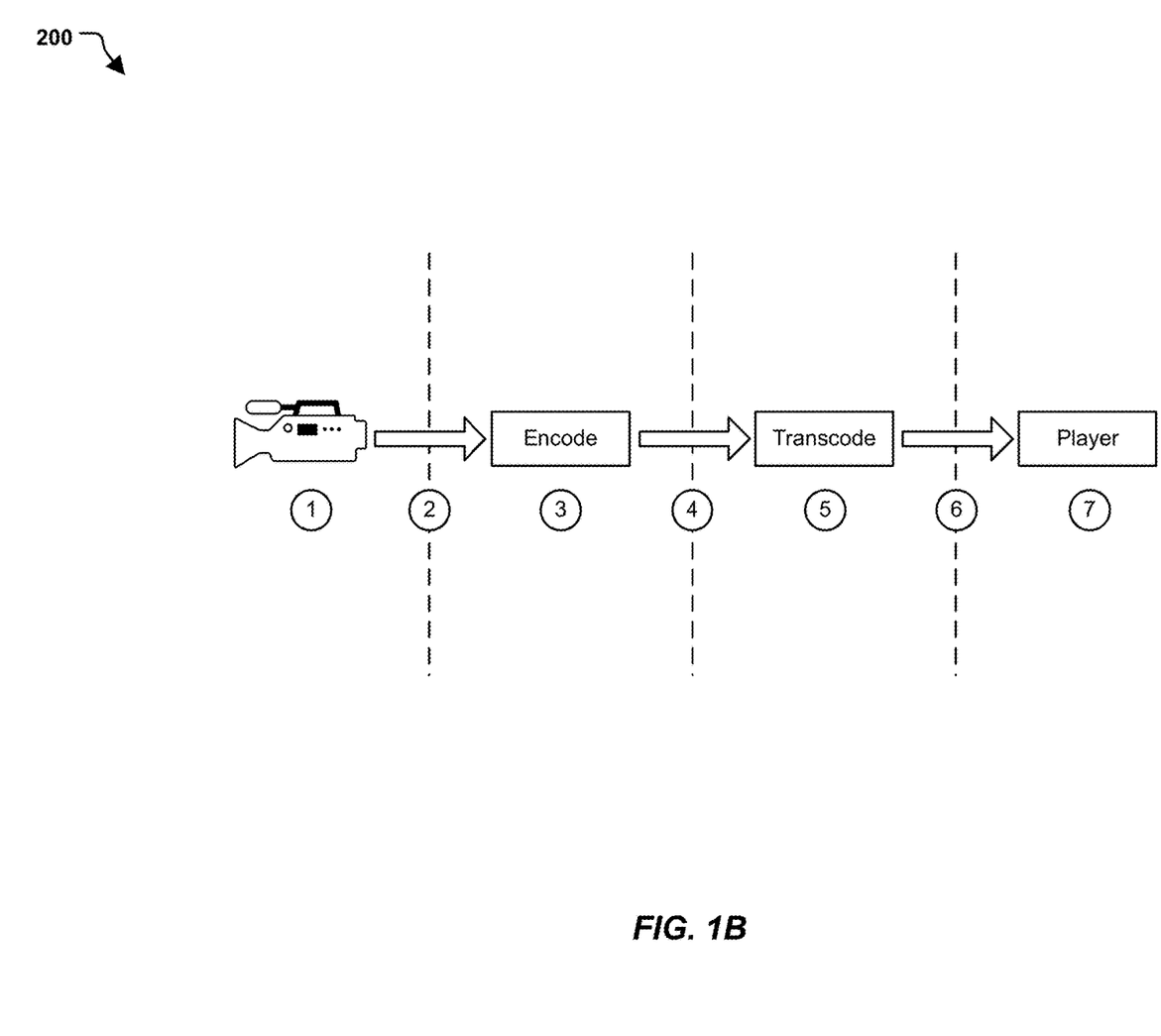

To illustrate, referring to FIG. 1B, the live stream parameters 114 may include parameters related to operation at the capture device (designated "1"), communication (designated "2") of a captured signal or stream to an encoding process/device (designated "3"), operation of the encoding process/device, communication (designated "4") of encoded output from the encoding process/device to a transcoding process/device (designated "5"), operation of the transcoding process/device, communication (designated "6") from the transcoding process/device to a player (designated "7"), and/or operation at the player. To further illustrate, parameters related to operation at the capture device may include a frame rate, a bit rate, a frame size, etc. Parameters related to operation of the encoding process/device may include a frame rate, a bit rate, a frame size, an encoding algorithm, an encoder type, etc. Parameters related to operation of the transcoding process/device may include a frame rate, a bit rate, a frame size, transcoding algorithm(s), transcoder type(s), transcoder profile(s), number and particulars of ABR renditions to be generated, etc. Parameters related to operation at the player may include buffer size, threshold conditions at which to switch to a higher or lower ABR rendition, decoding algorithm(s), decoder type(s), number and type of network connection(s) in use to receive a stream, etc. Parameters related to communication between the various devices/processes shown in FIG. 1B may include the communication protocol in use, characteristics of wired and/or wireless connection(s) in use, presence and particulars of intermediate devices or networks (e.g., a CDN, the Internet, or a cloud delivery infrastructure), etc.

Data storage device(s) 162 (e.g., solid-state drive (SSD) devices, magnetic storage, optical storage, etc.) may be used to store streamed events. In some examples, the data storage device(s) 162 may also buffer chunks of an ABR rendition and store software programs and/or data used by the media device 150. The data storage device(s) 162 may include one or more computer-readable storage devices, such as random-access memory (RAM) devices, read-only memory (ROM) devices, hard-drive(s), solid state drive(s), one or more other types of storage devices, or any combination thereof. The data storage device(s) 162 may store instructions 163 executable by the processor(s) 152 to perform, initiate, or control one or more operations described herein.

The test controller 130 includes processor(s) 132 and data storage device(s) 134 (e.g., solid-state drive (SSD) devices, magnetic storage, optical storage, etc.). The data storage device(s) 134 are configured to store instructions 135 executable by the processor(s) 132 to perform, initiate, or control one or more operations described herein. In FIG. 1A, the test controller 130 is configured to receive, determine, and/or output test parameters 138, as described further herein.

Live streams may be delivered to and viewed at various type of computing devices. In FIG. 1A, computing devices of the test audience 180 may receive media stream(s) from the media device 150. For example, computing devices of the test audience 180 may include one or more computer systems 182, such as desktop computers, laptop computers, etc. Computing devices of the test audience 180 may also include one or more televisions (TVs) 192, set-top-boxes 184, smartphones 186, and tablet computers 188. In a particular implementation, the media device 150 is configured to send media streams to one or more media server(s) 190, such as edge servers of a content delivery network (CDN). Although actual devices are shown in FIG. 1A, in some examples, at least some of the test audience 180 may be simulated using virtual connections. For example, cloud-based virtual machines may be instantiated and instructed to connect to stream sources (e.g., the media device 150, CDN edge nodes, etc.). The number and timing of such connections may be used to simulate different streaming loads. For example, a high number of connections may be made in a relative short period of time to simulate viewers of a live sports event or trivia game. As another example, connections may be gradually varied up and down to simulate viewership of a congressional hearing.

In some implementations, computing devices of the test audience 180 differ from computing devices of the live stream audience 194. For example, in one implementation, at least one computing device of the of the test audience 180 is not included in computing devices of the live stream audience 194 (or vice versa). In other implementations, computing devices of the test audience 180 can correspond to computing devices of the live stream audience 194. Depending on the particular example, computing devices of the live stream audience 194 can include one or more computer systems 182, one or more TVs 192, one or more set-top-boxes 184, one or more smartphones 186, one or more tablet computers 188, one or more media server(s) 190, one or more other computing devices, or a combination thereof.

During operation at the system 100, the media device 150 may receive user input (e.g., via a graphical interface, a mouse, a keyboard, or another form of input) to configure a first live stream 102. In one example, the user input is received in connection with a multimedia application 166 executed by the media device 150. In a particular example, the multimedia application 166 accesses one or more of the camera 176 or the microphone 178 to record data that is processed (e.g., by the encoder 156, the first transcoder 160, the second transcoder 164, or a combination thereof) to generate the first live stream 102. Alternatively, the first live stream 102 is generated based on data received from external stream capture device(s). In some examples, the first live stream 102 is (expected) to be streamed to the live stream audience 194.

Prior to streaming the first live stream 102, the test controller 130 may provide an indication 106 of a test of the first live stream 102. To illustrate, in one example, upon receiving user input to initiate the first live stream 102, the media device 150 communicates with the test controller 130 to initiate a test of the first live stream 102. In this example, the media device 150 may send a request 104 to the test controller 130 to test the first live stream, and the test controller 130 may send the indication 106 in response to the request 104. In some examples, the request 104 indicates an identity of the media device 150 (e.g., an address, such as an Internet Protocol (IP) address or a media access control (MAC) address), an identity of a user of the media device 150 (e.g., an email address or other user information/login credentials), an indication of the multimedia application 166, information regarding the first live stream 102, information regarding the initially selected live stream parameters 114, one or more other criteria, or a combination thereof.

In some examples, the request 104 indicates participants of the first live stream 102 (e.g., viewers that are currently "joined" or that are scheduled to join streaming by the media device 150). For example, the request 104 can indicate IP addresses of the participants. In some examples, the participants indicated by the request 104 are used to determine the test audience 180, the live stream audience 194, or both.

In some examples, the media device 150 presents the indication 106 (or another indication) to confirm that the first live stream 102 is to be tested (e.g., prior to the first live stream 102 going live). For example, the media device 150 may generate a graphical indication to inform a user that the first live stream 102 is to be, or is being, tested. The indication 106 results in initiation of a second live stream 108 to the test audience 180. In some examples, the media device 150 displays, in response to the indication 106 and in connection with execution of the multimedia application 166, a graphical indication including a text box and a button clickable by the user to initiate the second live stream 108 to the test audience 180. In some examples, the pre-flight live stream test results generated in accordance with the present disclosure are shown to a user on a dashboard that divides the end-to-end stream generation and transport process similar to the paradigm used in FIG. 1B. Places with predicted problems may be visually highlighted using different colors/flashing, and recommendations may be provided for such places. In some examples, the dashboard shows test results, problems, and/or recommended solutions for different geographic regions/locations using a map.

In a particular example, the test audience 180 is based on test parameters 138 received, determined, and/or output by the test controller 130. To illustrate, at least a subset of the test parameters 138 may be based on a user's initial selection of the live stream parameters 114, which may include encoding parameters, transcoding parameters, network communication parameters, expected audience characteristics, etc. By testing the user's initially selected live stream parameters 114, the described techniques may be able to determine whether viewers of the first live stream 102 would be likely to encounter problems connecting to or viewing the first live stream 102, were the user's initially selected live stream parameters 114 used during streaming of the first live stream 102. When problems are predicted, the user's initially selected live stream parameters 114 may be modified. Such modifications may be made manually by the user, for example based on recommendations displayed by the multimedia application 166. Alternatively, or in addition, modifications to the live stream parameters 114 may be made automatically. In some examples, the modified live stream parameters 114 may be tested using a third live stream, and this iterative test/modify pattern may be performed one or more times until the live stream parameters 114 are predicted to be satisfactory for the expected audience characteristics input by the user. In some examples, heuristics may be used to determine what changes to recommend based on what pre-flight live testing results. As an illustrative non-limiting example, heuristics may be used to assess ABR playback and rendition settings when evaluated for different network situations (e.g., mobile vs. Wi-Fi vs. wired, etc.). As another example, heuristics may be used to evaluate hardware encoder settings and performance, which can correspond to an ingest/first mile segment of the end-to-end live stream configuration.

Thus, in some implementations, the test parameters 138 may indicate one or more of an estimated number of viewers 140 of the first live stream 102, an estimated plurality of locations 142 of the viewers of the first live stream 102, an estimated join rate 144 associated with the viewers of the first live stream 102 (which may include ramp-up and/or ramp-down rates), or a combination thereof. In some examples, the test controller 130 is configured to determine one or more of the estimated number of viewers 140, the estimated plurality of locations 142, or the estimated join rate 144 based on a profile 136 associated with the media device 150 or a user of the media device 150.

In some examples, the profile 136 indicates history information associated with the media device 150 or a user of the media device 150. For example, the history information can be based on one or more prior live streams by the media device 150, such as based on a historical audience (e.g., a typical or "average" audience) of live streams of the media device 150 or a user of the media device 150. To further illustrate, in one example, the estimated number of viewers 140 of the first live stream 102 is based on a historical audience size indicated by the profile 136. Alternatively, or in addition, the estimated plurality of locations 142 of the viewers of the first live stream 102 can be based on historical locations of viewers indicated by the profile 136. Alternatively, or in addition, the estimated join rate 144 associated with the viewers of the first live stream 102 can be based on historical join rates indicated by the profile 136.

In the example of FIG. 1A, the test of the first live stream 102 includes presenting the second live stream 108 to the test audience 180. For example, the media device 150 may send the second live stream 108 to the test audience 180 (which may include actual player devices and/or virtual machines) via the network 120. In another example, the media device 150 sends the second live stream 108 to the test controller 130, and the test controller 130 sends the second live stream 108 to the test audience 180. The media device 150 (or the test controller 130) may use one of a plurality of streaming protocols to provide the stream to the test audience 180, including but not limited to real-time transport protocol (RTP), real-time transport protocol (RTP) control protocol (RTCP), real-time messaging protocol (RTMP) over transmission control protocol (TCP), or real-time streaming protocol (RTSP). In adaptive streaming scenarios, communicating the second live stream 108 to a non-player device, such as a CDN edge, may including communicating multiple renditions of the second live stream 108 to the non-player device. Communicating the second live stream 108 to a player device may include communicating chunks of a particular rendition until the player device requests a switch to a different rendition.

In a particular example, the test controller 130 receives streaming performance and/or stream quality data, such as quality of service (QoS) data 110, from the test audience 180. In some examples, the QoS data 110 indicates quality of the second live stream 108 as received by the (devices in the) test audience 180. To illustrate, in some examples, computing devices of the test audience 180 provide input indicating latency or error rate of the second live stream 108 caused by congestion of one or more segments of the network 120, as an illustrative example. In some examples, each computing device of the test audience 180 executes a copy of the multimedia application 166 (or a player application), and the application prompts viewers of the second live stream 108 to "vote" on quality of the second live stream 108 to generate the QoS data 110. In other examples, QoS data is automatically generated at the player applications based on buffer occupancy over time and whether underflow or overflow conditions occur, ABR transitions, stream latency, stream jitter, how long it takes to receive stream chunks after a request is made, dropped frames/packets, etc.

To further illustrate, in some examples, the QoS data 110 includes an indication of available network bandwidth based on a signal strength of the network 120, for example as measured by a particular computing device of the test audience 180. The signal strength measurement can be a decibel (dB) measurement corresponding to a signal-to-noise ratio (SNR), a peak SNR (PSNR), a signal-to-interference-plus-noise ratio (SINR), etc. Alternatively, or in addition, when TCP is used to transmit the second live stream 108, a particular computing device of the test audience 180 may detect a change in available network bandwidth of the network 120 based on TCP packet loss. For example, in the event of a loss of a TCP packet, one or more of computing devices of the test audience 180 may request that the test controller 130 or the media device 150 retransmit the packet, and the QoS data 110 may be based at least in part on a number of the retransmission requests. Alternatively, the test controller 130 (or the media device 150) may automatically resend any packets for which no acknowledgement is received from a recipient device of the test audience 180. In this example, the media device 150 (or the test controller 130) may track the number of packets that have been retransmitted to estimate available network bandwidth, and the QoS data 110 may be based on the number of retransmitted packets. In an additional example, RTP is used to transmit the second live stream 108, and RTCP is used in conjunction to determine the QoS data 110. In this case, the test controller 130 (or the media device 150) may detect a change in available network bandwidth based on a receiver report associated with a recipient device of the test audience 180. It should be noted that the mechanisms described herein to estimate or measure the QoS data 110 are for illustration, and not to be considered limiting. In alternate implementations, different mechanisms may be used to measure or determine the QoS data 110.

In some implementations, the test controller 130 is configured to modify one or more of the live stream parameters 114 based on the QoS data 110. For example, the frame rate, the frame size, one or more bit rate(s) of one or more ABR renditions, a transcoder type or profile used to generate such ABR renditions, one or more other parameters, or a combination thereof, may be modified based on the QoS data 110. As a particular illustrative example, if the QoS data 110 indicates buffer underflow or long buffering wait times at one or more players, then the frame rate, the bit rate, and/or the frame size of one or more renditions may be reduced. Alternatively, or in addition, a distribution plan for the first live stream 102 may be updated to allocate more computing resources, so that high latency or error rates that are caused by congestion at CDN edges can be alleviated. As another illustrative example, if the QoS data 110 indicates buffer underflow at one or more players, then the frame rate, the bit rate, and/or the frame size of one or more renditions may be increased (or higher quality rendition(s) may be added). Alternatively, or in addition, a distribution plan for the first live stream 102 may be updated to allocate fewer computing resources.

In some cases, changing the live stream parameters 114 includes changing transcoder settings or one or more transcoder profiles that will be used when the first live stream 102 goes live. In some cases, because QoS data 110 may originate from actual/virtual audience members in various places, the QoS data 110 can be examined on a per-location or per-region basis, and the live stream parameters 114 can accordingly be adjusted on a per-location or per-region basis. To illustrate, if QoS data 110 for North America does not indicate predicted streaming issues but QoS data for Australia indicates predicted streaming issues, video settings, audio settings, encoding/transcoding resources, and/or distribution resources may be adjusted for Australian audiences but not for North American audiences. Alternatively, some resources that were previously allocated for North American audiences may instead be allocated for Australian audiences. In some examples, the test controller 130 is configured to send an indication of the one or more live stream parameters 114 (or modifications thereto) to the media device 150 (e.g., via a message 112).

It is to be understood that the second live stream 108 will likely not include the same content as the first live stream 102. This is because when the testing using the second live stream 108 occurs, the video and audio content of the first live stream 102 may not have even been captured (though this may not be true in a scenario where a pre-recorded content is re-broadcast as a live stream), and the updated live stream parameters 114 may in some cases include parameters that impact the capturing and/or initial encoding of the first live stream 102. However, the second live stream 108 may be generated so as to simulate characteristics of the first live stream 102 as indicated by the live stream parameters 114 (e.g., in terms of keyframe interval, video codec used, audio codec used, etc.). In some examples, the second live stream 108 may be a live re-broadcast of at least a portion of a previous stream that was recorded and stored, for example at the data storage device(s) 162. In other examples, the second live stream 108 may be based on stored "stock" test content.

The media device 150 may be configured to initiate the first live stream 102 based on the one or more live stream parameters 114, which may be modified from a user's initial selections based on the results of the above-described "pre-flight live stream testing." As described herein and illustrated in FIG. 1B, the live stream parameters 114 may affect operation of capture devices, encoders, transcoders, and players, and also affect communication of data between those components. In some examples, the live stream parameters 114 (or modifications thereto) are communicated to components via application programming interfaces (APIs).

After the pre-flight live stream testing is completed, the first live stream 102 may be generated and communicated in accordance with the "final" live stream parameters 114. For example, a multimedia signal may be captured (e.g., using the camera 176 and the microphone 178) and may be processed (e.g., encoded, transcoded, etc.) to generate the first live stream 102 (which may correspond to multiple ABR renditions). The first live stream 102 may be sent to the live stream audience 194, for example upon request from individual player devices and/or via network "push" operations, such as to CDN edge nodes. Communication of the first live stream 102 may involve one or more streaming protocols, such as RTP, RTCP, RTMP over TCP, or RTSP.

By testing the first live stream 102 using the second live stream 108, performance may be improved relative to systems that test and adjust a live stream after the stream has already gone live. For example, in some cases, adjusting the one or more live stream parameters 114 prior to initiation of the first live stream 102 avoids the need to stop and restart the first live stream 102. As a result, performance of the system 100 and overall viewing experience may be improved.

Figure 2:
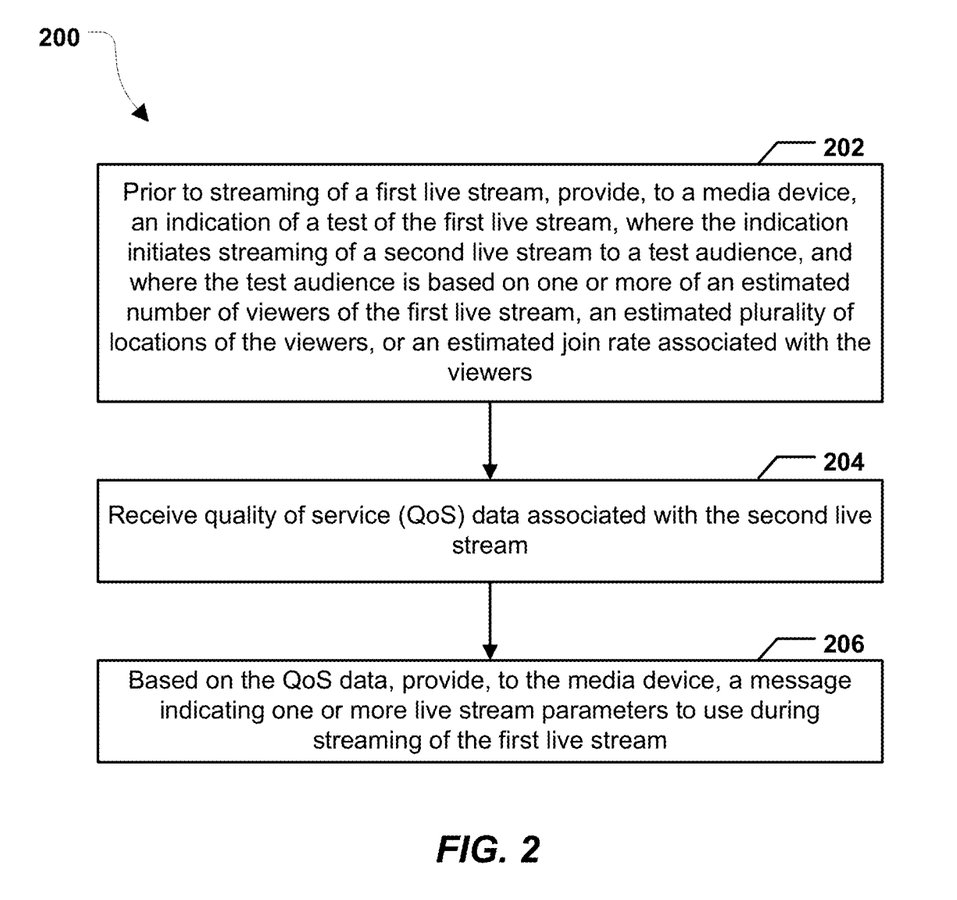
FIG. 2 is a flowchart that illustrates an implementation of a method of live stream testing performed by a server.

FIG. 2 illustrates a particular implementation of a method 200 of live stream testing. In an illustrative implementation, operations of the method 200 are performed by a computing device or portion thereof, such as the test controller 130 of FIG. 1A.

The method 200 includes providing to a media device, prior to streaming of a first live stream, an indication of a test of the first live stream, at 202. The indication initiates streaming of a second live stream from the media device to a test audience. The test audience is based on one or more of an estimated number of viewers of the first live stream, an estimated plurality of locations of the viewers, or an estimated join rate associated with the viewers. In a particular example, the test controller 130 is configured to provide the indication 106 to the media device 150 indicating that the first live stream 102 is to be tested. In some examples, the indication 106 initiates the second live stream 108 to the test audience 180, and the test audience 180 is based on one or more of the estimated number of viewers 140 of the first live stream 102, the estimated plurality of locations 142 of the viewers, or the estimated join rate 144 associated with the viewers.

The method 200 further includes receiving (e.g., during or after performing the test) quality of service (QoS) data associated with the second live stream, at 204. In a particular example, the test controller 130 is configured to receive the QoS data 110 associated with the second live stream 108.

The method 200 further includes providing to the media device, based on the QoS data, a message indicating one or more live stream parameters to use during streaming of the first live stream, at 206. In a particular example, the test controller 130 is configured to send the message 112 to the media device 150 to indicate the one or more live stream parameters 114 (or modifications thereto). Such indications may be used to automatically modify the live stream parameters 114 before the first live stream 102 is captured, encoded, transcoded, and/or streamed. Alternatively, such indications may be used to recommend certain stream parameter changes to the user. For example, the user may be prompted to switch transcoding profiles, increase network bandwidth between the encoder and a cloud transcoder, etc.

Figure 3:
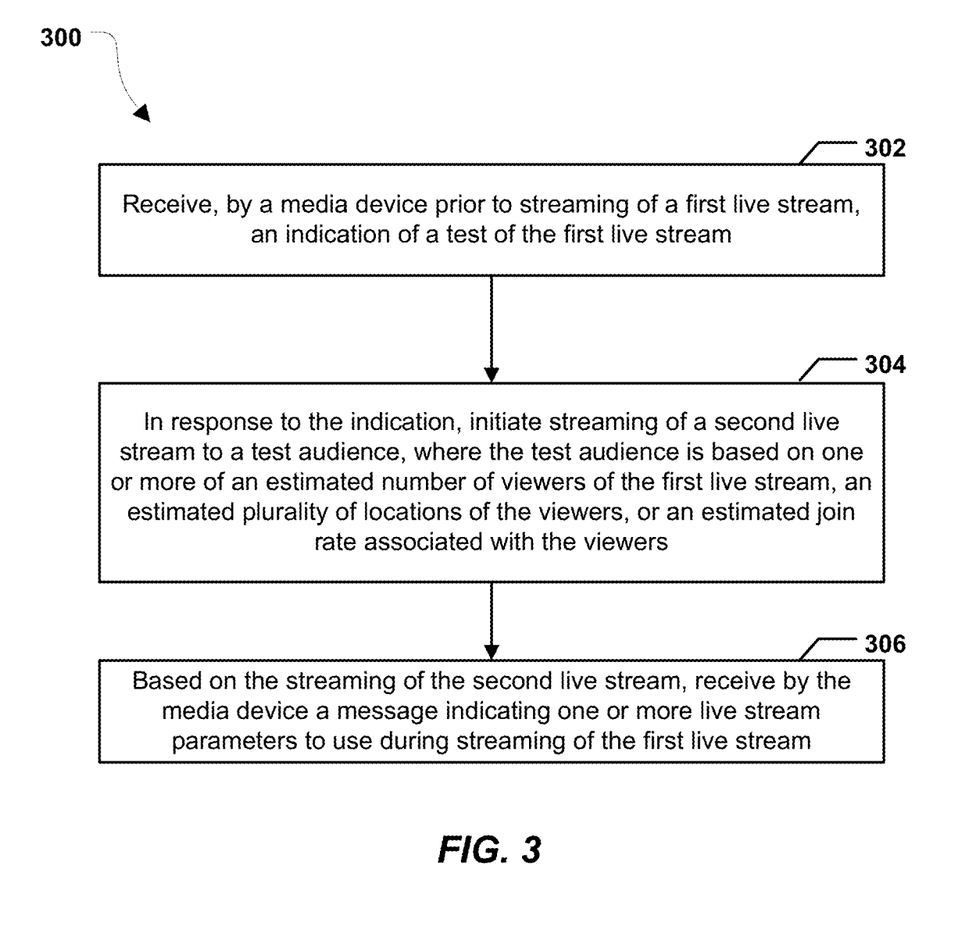
FIG. 3 is a flowchart that illustrates an implementation of a method of live stream testing performed by a media device.

FIG. 3 illustrates a particular implementation of live stream testing. In a particular example, operations of the method 300 are performed by a media device, such as the media device 150.

The method 300 includes receiving, by a media device prior to streaming of a first live stream, an indication of a test of the first live stream, at 202. In a particular example, the media device 150 is configured to receive the indication 106 from the test controller 130.

The method 300 further includes initiating, in response to the indication, streaming of a second live stream to a test audience, at 304. The test audience is based on one or more of an estimated number of viewers of the first live stream, an estimated plurality of locations of the viewers, or an estimated join rate associated with the viewers. In a particular example, the media device 150 is configured to initiate the second live stream 108 to the test audience 180, and the test audience 180 is based on one or more of the estimated number of viewers 140 of the first live stream 102, the estimated plurality of locations 142 of the viewers, or the estimated join rate 144 associated with the viewers.

The method 300 further includes, based on the streaming of the second live stream, receiving by the media device a message indicating one or more live stream parameters to use during streaming of the first live stream, at 306. In a particular example, the media device 150 is configured to receive the message 112 from the test controller 130 indicating the one or more live stream parameters 114 for the first live stream 102.

It should be noted that the orders of operations illustrated in the flowcharts of FIGS. 2 and 3 and described elsewhere herein are to be considered illustrative, and not limiting. In alternate implementations, the order of operations may be different. Further, one or more operations may be optional and/or replaced by other operations. In addition, one or more operations may be consolidated and in some cases may be performed at least partially concurrently.

It should be noted that although the foregoing implementations are described with reference to a live stream being captured by a media device, in alternate implementations, the described techniques may also be used in conjunction with media data stored at the media device (e.g., a video on demand (VOD) stream). When the media data is stored at the media device 150, the media device 150 may decode the media data via the decoder 158 prior to re-encoding the data via the encoder 156.

In accordance with various implementations of the present disclosure, one or more methods, functions, and modules described herein may be implemented by software programs executable by a computer system. Further, implementations can include distributed processing, component/object distributed processing, and/or parallel processing.

Particular implementations can be implemented using a computer system executing a set of instructions (e.g., the instructions 135 or the instructions 163) that cause the computer system to perform any one or more of the methods or computer-based functions disclosed herein. A computer system may include a laptop computer, a desktop computer, a server computer, a mobile phone, a tablet computer, a set-top box, a media player, a hardware encoder one or more other computing devices, or any combination thereof. The computer system may be connected, e.g., using a network, to other computer systems or peripheral devices. For example, the computer system or components thereof can include or be included within the media device 150 of FIG. 1A.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular implementation, the instructions can be embodied in a computer-readable or a processor-readable device, such as the data storage devices 134, 162. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, webcam feeds, birthday parties, school plays, and other streams captured by fixed or mobile devices. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method comprising:
   prior to streaming of a first live stream, providing, to a media device, an indication of a test of the first live stream, wherein the indication initiates streaming of a second live stream to a test audience, and wherein the test audience is based on one or more of an estimated number of viewers of the first live stream, an estimated plurality of locations of the viewers, or an estimated join rate associated with the viewers;
   receiving quality of service (QoS) data associated with the second live stream; and
   based on the QoS data, providing, to the media device, a message indicating one or more live stream parameters to use during streaming of the first live stream.

2. The method of claim 1, wherein the one or more live stream parameters include a transcoder profile associated with the first live stream.

3. The method of claim 1, wherein the one or more live stream parameters include a bit rate associated with the first live stream.

4. The method of claim 1, wherein the one or more live stream parameters include a frame rate associated with the first live stream.

5. The method of claim 1, wherein the one or more live stream parameters include a frame size associated with the first live stream.

6. The method of claim 1, further comprising storing the one or more live stream parameters in a profile associated with the media device or with a user of the media device.

7. The method of claim 1, further comprising streaming the first live stream in accordance with the live stream parameters that are based on the QoS data associated with the second live stream, wherein at least one member of an audience of the first live stream was not included in the test audience of the second live stream.

8. An apparatus comprising:
   a memory; and
   a processor coupled to the memory, the processor configured to perform, control, or initiate operations comprising:
   prior to streaming of a first live stream, provide, to a media device, an indication of a test of the first live stream, wherein the indication initiates streaming of a second live stream to a test audience, and wherein the test audience is based on one or more of an estimated number of viewers of the first live stream, an estimated plurality of locations of the viewers, or an estimated join rate associated with the viewers;
   receive quality of service (QoS) data associated with the second live stream; and
   based on the QoS data, provide, to the media device, a message indicating one or more live stream parameters to use during streaming of the first live stream.

9. The apparatus of claim 8, wherein the one or more live stream parameters include a transcoder profile associated with the first live stream.

10. The apparatus of claim 8, wherein the one or more live stream parameters include a bit rate associated with the first live stream.

11. The apparatus of claim 8, wherein the one or more live stream parameters include a frame rate associated with the first live stream.

12. The apparatus of claim 8, wherein the one or more live stream parameters include a frame size associated with the first live stream.

13. The apparatus of claim 8, further comprising storing the one or more live stream parameters in a profile associated with the media device or with a user of the media device.

14. The apparatus of claim 8, wherein at least one member of an audience of the first live stream was not included in the test audience of the second live stream.

15. A computer-readable storage device storing instructions that, when executed by a processor, cause the processor to perform operations comprising:
  prior to streaming of a first live stream, providing, to a media device, an indication of a test of the first live stream, wherein the indication initiates streaming of a second live stream to a test audience, and wherein the test audience is based on one or more of an estimated number of viewers of the first live stream, an estimated plurality of locations of the viewers, or an estimated join rate associated with the viewers;
  receiving quality of service (QoS) data associated with the second live stream; and
  based on the QoS data, providing, to the media device, a message indicating one or more live stream parameters to use streaming of the first live stream.

16. The computer-readable storage device of claim 15, wherein the one or more live stream parameters include a transcoder profile associated with the first live stream.

17. The computer-readable storage device of claim 15, wherein the one or more live stream parameters include a bit rate associated with the first live stream.

18. The computer-readable storage device of claim 15, wherein the one or more live stream parameters include a frame rate associated with the first live stream.

19. The computer-readable storage device of claim 15, wherein the one or more live stream parameters include a frame size associated with the first live stream.

20. The computer-readable storage device of claim 15, further comprising storing the one or more live stream parameters in a profile associated with the media device or with a user of the media device.

* * * * *